Jan. 7, 1947.  J. F. CALDWELL, JR  2,413,683
AERIAL NAVIGATION INSTRUMENT
Filed Oct. 14, 1943   2 Sheets-Sheet 1

INVENTOR.
John F. Caldwell Jr.
BY William F. Nickel
ATTORNEY

Jan. 7, 1947. J. F. CALDWELL, JR 2,413,683
AERIAL NAVIGATION INSTRUMENT
Filed Oct. 14, 1943 2 Sheets-Sheet 2

INVENTOR.
John F. Caldwell Jr.
BY William F. Nickel
ATTORNEY

Patented Jan. 7, 1947

2,413,683

UNITED STATES PATENT OFFICE 2,413,683

AERIAL NAVIGATION INSTRUMENT

John F. Caldwell, Jr., Coral Gables, Fla.

Application October 14, 1943, Serial No. 506,137

9 Claims. (Cl. 33—46.5)

This invention relates to improvements in navigating instruments; and particularly to a simple and compact device of the class mentioned for use upon aircraft.

It is an object of the invention to provide a navigating instrument consisting of but few parts which can be readily and inexpensively made and assembled in production; and in practice easily and quickly operated and read to give an airplane pilot correct data with respect to his course and progress in flight.

A further object of the invention is to provide a navigating instrument by which an aviator can readily determine the compass heading required for a true course, and the rate of travel with reference to the surface of the earth. To this end the instrument is adapted to indicate the ground speed of the ship, and to enable compensation to be made for the effects of magnetic variation, compass deviation, and wind velocity and direction. In its preferred embodiment, my invention has the form of a unit which is calculated to serve all the purposes just enumerated.

Other objects and advantages are set out in the following specification, taken with the drawings; which show the best design now known to me. But the disclosure is by way of example only, and various changes may be made in shape, size and arrangement of parts; without deviating from the principle of the invention.

On said drawings.

The same numerals identify the same parts throughout.

Figure 1:
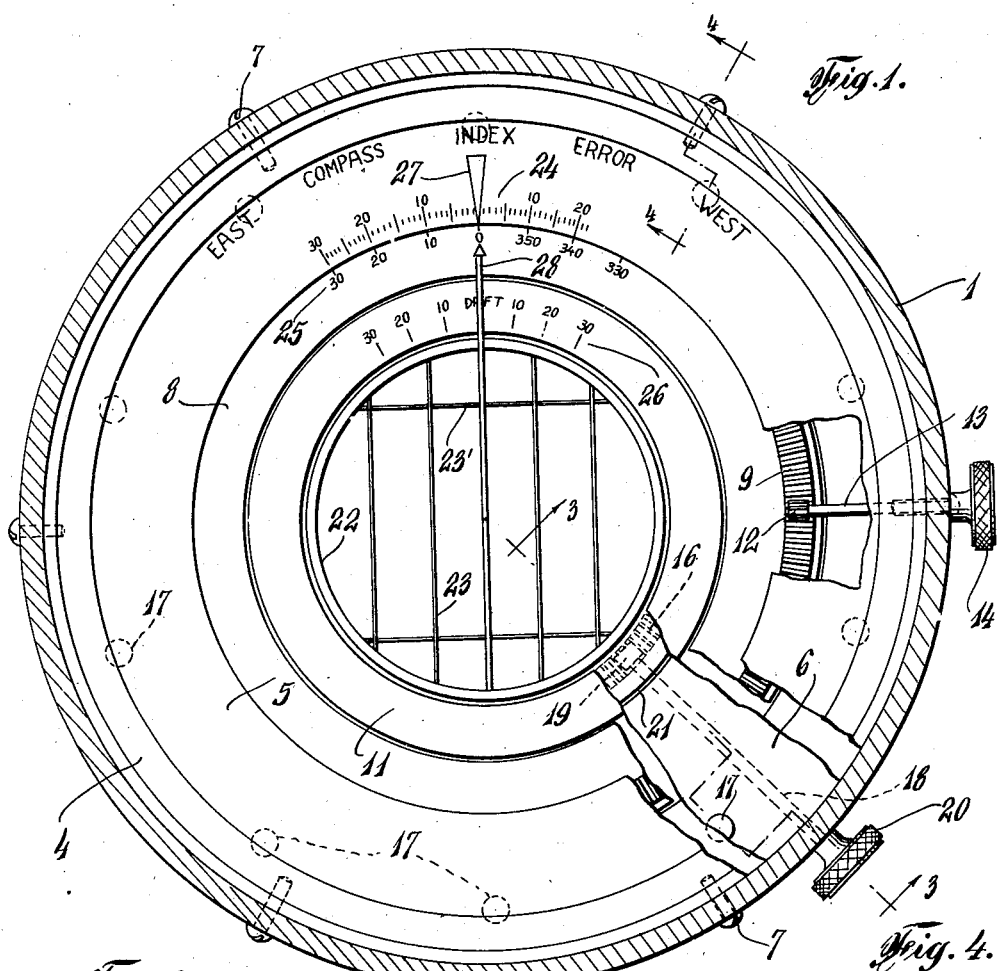
Figure 1 is a side view partly in section of a navigating instrument according to this invention, taken substantially in the plane of line 1—1, Figure 2.
Figures 3, 4:
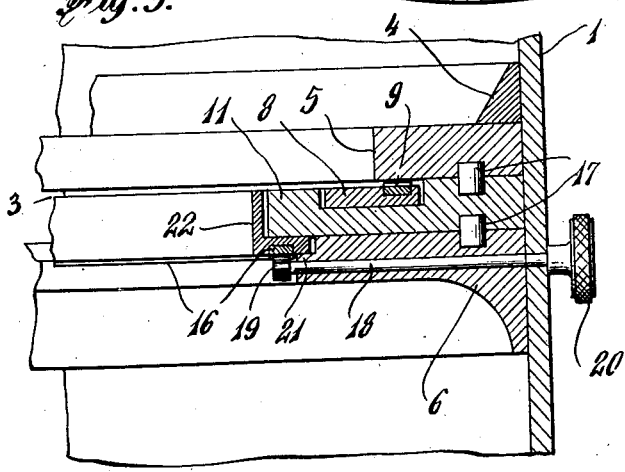
Figure 3 is a section on line 3—3, Figure 1.
Figure 4 is a transverse section on line 4—4 of Figure 1.
Figure 2:
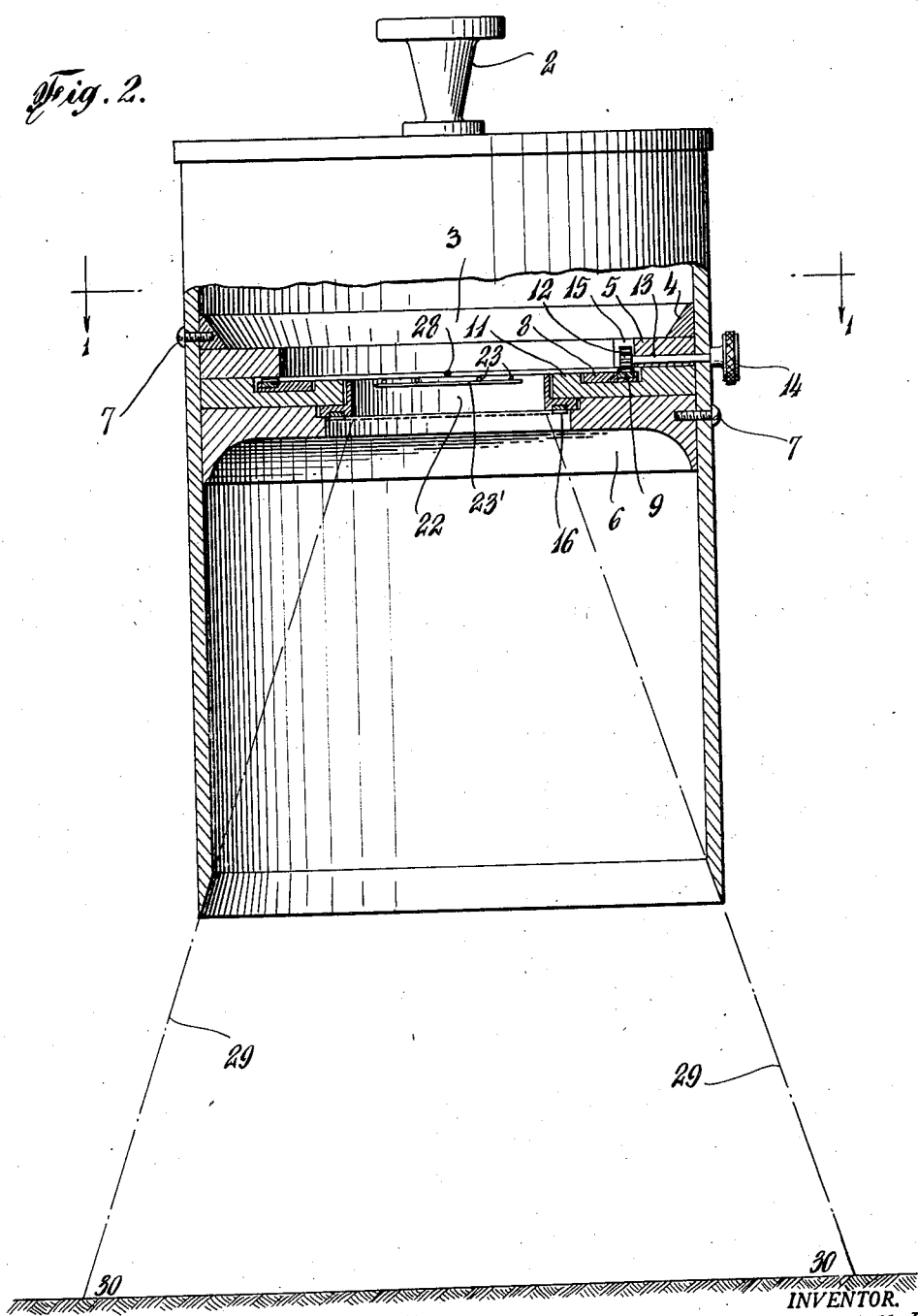
Figure 2 is an axial section.

The instrument is housed in a casing 1, shaped like a cylinder with an open lower end, and a closed top. The latter has a peep or sight hole at the center, surrounded by a fixed eye-piece 2. The principal parts of the instrument, indicated as a whole at 3, are mounted within the casing; supported by a broad ring 6, forming an annular seat; and held upon the seat by a narrow ring 4. These rings are removably secured in the casing by screws 7.

The device further comprises a stationary ring 5, adjacent the ring 4, and a wider stationary ring or support 11 engaged by the ring 6. The rings 5 and 11 are flat and lie between the rings 4 and 6. The rings 5, 6 and 11 have recesses as shown in Figure 1 to receive studs 17, so that the rings 5, 6 and 11 are also held in fixed position. The ring 11 has an annular groove in which is placed an adjustable ring 8, flush with the ring 11. The ring 8 and its groove are overlapped on one edge by the fixed ring 5. Under the ring 8, the ring 8 carries on its adjacent face a circular rack 9 which is engaged by a pinion 12. This pinion is fixed upon a shaft 13 mounted in a bearing provided by the ring 5, and projecting out through an opening in the casing 1. It carries on its exterior end a knob 14 to enable it to be turned. The inner edge of the ring 5 has a recess 15 into which the pinion 12 has a free fit.

Mounted in a bore drilled through the seating ring 6 is a spindle 18, projecting from the ring 6 at its inner edge. This spindle carries on its inner extremity a pinion 19 in mesh with a circular rack 16 on the lower face of an outwardly flanged central element or ring 22. The latter is encircled by the ring or support 11 and its upper end is flush with the top of ring 11. The shaft 18 also projects through the casing 1 and carries on its outer end a knob 20. The rack 16 is near the middle of the rim or flange of the element 22 and its outer edge engages a shoulder or seat 21 on the upper face of the supporting ring 6. The element 22 at its upper end is spanned by several wires or filaments 23 and 23'.

A portion of the face of the annular member or ring 5 presented to the eye-piece 2, or upper face thereof, bears gradations extending in two days, and other indications 24; and an adjacent portion of the exposed part of the upper face of the annular member or ring 8 carries gradations 25. Likewise, the upper face of the annular support 11 bears, in proximity to the gradations 25, a third set of gradations extending two ways, with additional indications 26. At the center or zero mark of the gradations 24, on the ring 5, is a reference or index mark 27, and on the element 22 is a central pointer 28 that cooperates with the scales 25 and 26.

The gradations and indications on Figure 1 serves as follows: The scale 24 is the compass error scale and is stationary and graduated in degrees from 0° through a sufficient range to both the right and left of the index mark 27 (designated west and east). The scale 25 is the compass bearing or correction scale, which is movable or adjustable in either direction 360° and graduated in degrees from 0° through 360° counter-clockwise (normally a compass is graduated clockwise). The scale 26 is the drift scale, upon the support 11, and graduated in degrees from 0° upward to the right and left of center index. The element 22 with the wires 23 and 23' is the drift-sight grid, which is movable in either direction; and comprises five parallel wires 23, the central wire carrying the pointer 28, which overlies the drift and compass scales as shown; and two similar wires 23' across the ends of the others.

The instrument is installed on the aircraft in such a manner that the central index mark 27 is on or parallel to the longitudinal center line of the ship, and the ground or sea is visible through the drift-sight grid. The operation can be explained by the following example: Given a desired track or "true course" of 0°. Known magnetic variation is 15° east and known compass deviation is 5° west. First, by turning the knob 14 and moving or adjusting the ring or member 8, set 0° on the scale 25 opposite the total or net compass error on scale 24 (algebraic sum of 15° east variation and 5° west deviation=10° east compass error), and read compass course to be flown on compass scale 25 under index 27=350°. Hence, the true course to be flown is 10° west of north on the compass scale, or 350°, because the compass points not north but 10° east thereof. This step may be performed before flight or in the air. Second, in the air on a compass course of 350°, observation of the ground or sea through the drift-sight grid will reveal that objects on the surface have an apparent motion across the grid. By means of the thumbscrew or knob 20, shift the ring 22 until these objects apparently move parallel to the grid lines 23. Read compass heading to be flown, to make good a track of 0°, on scale 25 under pointer 28. At the same time, the amount of drift, to right or left, may be read off scale 26 under pointer. In the above example, if the drift observed were 10° right, or east, the pointer 28 would indicate on the scale 25 a compass heading of 340° as giving the correct course. That is, the craft is drifting 10° further to the east, and this will have to be added to the previous allowance of 10° of compass error.

The above problem has been solved by the instrument directly without any mental calculations on the part of the operator and the consequent chance of error on his part. Now, with the aircraft on a compass heading of 340°, the drift sight grid lines are again lined up with the apparent motion of objects on the surface and the compass heading of 340° on the scale 25 is placed opposite the pointer 28. Then, by occasional observation, if the grid lines are kept parallel with the line of passage over objects on the surface, the pointer 28 will continue to indicate, on the scale 25, the heading to be flown to make good a track of 0°—compass error remaining the same.

The ground speed of the aircraft may be gauged as follows, reference being made to Figure 1. The lines 29 from the peep hole in the top 2 past the wires 23' to points 30 on the ground, may enclose an angle of 30°. This is shown in Figure 1, in a vertcial plane transverse to that containing the pointer 28, but the conditions of the problem are clear. While one makes an observation through the eye-piece, if the length of time in seconds is determined for an object to pass between the wires 23, the formula here given may be used to compute ground speed:

$$\text{Ground speed} = \frac{a}{t} \times .3199 \text{ (nautical miles)}$$

Where "$a$"= altitude, "$t$"= time in seconds. Obviously, a graph could be set up whereby various possible ground speeds are plotted against altitudes as ordinates and time in seconds as abscissa, so that ground speeds could be picked off of the curve directly. The graph itself would be located within the aircraft in a place easily seen by the operator. A stop watch can be used for accuracy.

Due to the inherent rolling and pitching of aircraft in rough air, the drift-sight ring could be mounted on the gimbals of a small gyroscope (such as is currently used in aircraft instruments) to eliminate errors from rough air and vibration.

Also, curves could be set up from which the operator, having determined drift and ground speed from the instrument, could pick the wind direction and velocity at his altitude.

The instrument is intended especially for small civil or military aircraft in cross-country flying. In such planes, the aviator must use both feet and at least one hand for the controls. The compactness of the instrument and ease of operation make it well suited for conditions of this kind.

It will be seen that the "East" and "West" parts of the compass error scale or indicator are reversed in position with respect to the locations of these directions or points upon a map or a compass. This is the usual arrangement in an instrument of this type. Hence, with the compass bearing scale 25 graduated in a reverse or counter-clockwise manner, the zero mark of the compass bearing scale 25 will always lie on that side of the index mark 27 which corresponds in the true geographical sense to the direction in which the allowance for the compass error must be made. For instance, in the example above given, the compass needle points 10° too far to the east; hence, the true course to be flown must be plotted as if north were at 350° on both the compass scale and that of the instrument as shown in Figure 1 at 25. This 350° mark of the compass will be at the left or to the west of the compass needle (360° on the compass scale) and 0 on the scale 25 will be to the left of the index mark 27 of the instrument. Thus, compensation or correction can be readily made and confusion which might easily ensue if true north were found at one side of the compass needle and the resultant position of the zero mark on the scale 25 of the instrument on the opposite side of the mark 27, is avoided.

Similarly, if the error is such as to pull the needle west of north, the correction must be to the east or to the right of 360° on the compass scale. Here the zero mark on the scale 25 will also have to be moved to lie at the right of the index 27.

This advantage further is not lost or diminished by the subsequent independent manipulation of the indicator element 22 to determine the ground course. Whether the member 8 has to be moved further in the same direction as before, or in the reverse direction, because of the drift factor, this operation of the device can be performed with more certainty, because of the right correction for compass error in the first instance.

By removing the screws 7 and pinions 12 and 19, and pulling out spindles 13 and 18, the device can be taken apart at once.

Having described the invention, what I believe to be new and desire to secure and protect by Letters Patent of the United States is:

1. A navigating instrument having a stationary member carrying a compass error scale bearing "east" and "west" divisions in reversed position with respect to true geographical locations, an adjustable member bearing a scale for compass correction also calibrated in the reverse direction as regards the scale of the compass to be corrected, a stationary support having a drift scale and a movable pointer to cooperate with the drift and compass error scales.

2. A navigating instrument having a stationary member carrying a compass error scale having "east" and "west" divisions, an adjustable member bearing a scale for compass correction calibrated in a reverse direction with respect to the scale of the compass to be corrected, for cooperation with the mid-point of the compass error scale, a stationary support having a drift scale and a movable pointer to cooperate with the drift and compass error scales.

3. A navigating instrument having a stationary annular part bearing a compass error scale with "east" and "west" divisions and a central index mark, an annular member concentric with said part and adjustable with respect thereto, said member bearing a reversed scale for compass correction adjacent the compass error scale, a stationary annular support bearing a drift scale adjacent said member, an annular element adjacent said support and concentric therewith, gearing and operating shafts to move the member and element, the latter having a sight opening for viewing the direction of motion past outside objects, and a central pointer and cooperating with the scale on said member.

4. A navigating instrument having a stationary annular part bearing a compass error scale with "east" and "west" divisions and a central index mark, an annular member concentric with said part and adjustable with respect thereto, said member bearing a reversed scale for compass correction adjacent the compass error scale, an annular element adjacent said member and concentric therewith, gearing and operating shafts to move the member and element, an annular support for said member, said support having a scale between said element and the compass-bearing scale, said element having sight opening for viewing the direction of motion past outside objects, and a central pointer attached to said element and cooperating with the scales on said support and said member.

5. A navigating instrument comprising a casing open at one end and having an eye-piece at the other, a stationary scale-bearing ring in the casing, a stationary annular support having a circular groove in one face below said ring in the casing, a movable scale-bearing ring mounted in said groove, a stationary annular element having an annular seat in the casing adjacent the opposite face of said support, a second movable ring within the aforesaid support and having a flange engaging said seat, and means for independently operating each of said movable rings.

6. The navigating instrument according to claim 5, wherein said operating means comprises a circular rack on the first-named movable ring and a circular rack on said flange, a pinion engaging each rack and spindles extending to the outside of the casing to actuate said pinions.

7. A navigating instrument comprising a casing open at one end and having an eye-piece at the other, a stationary ring within the casing and having a circular groove in one face, said ring bearing a scale on said face surrounded by said groove, a movable scale-bearing ring mounted in said groove, a second stationary ring in said casing adjacent said face and overlapping the movable ring, said second stationary ring also having a scale thereon, a stationary element adjacent the opposite face of the first-named stationary ring and having an annular seat, a second movable ring within the first-named stationary ring and having a flange engaging said seat, a pointer on said second movable ring, and means for independently operating said movable rings.

8. The navigating instrument according to claim 7 wherein said operating means comprises a circular rack on the movable ring in said groove, covered by the second stationary ring, a circular rack on said flange adjacent the inner edge of said seat; pinions engaging the racks and spindles carrying said pinions and extending to the outside of the casing to actuate the pinions.

9. A navigating instrument for aircraft, having an adjustable element carrying an index pointer to be swung transversely of the longitudinal axis of said aircraft, a stationary support carrying a drift scale adjacent said pointer, an adjustable member having a compass correction scale adjacent said drift scale, said compass correction scale being calibrated in reverse order with respect to the scale of the compass to be corrected, a fixed member adjacent said adjustable member and carrying a compass error scale having the east and west divisions in reverse position with respect to the corresponding true geometrical locations, and an index mark between said divisions, in position to be aligned with said pointer when the latter extends in the same direction as the longitudinal axis of the aircraft, said pointer, when the compass correction scale has been shifted to allow for all compass errors, showing directly on said compass correction scale the bearing for the desired direction to be taken by said aircraft to offset said errors.

JOHN F. CALDWELL, Jr.